United States Patent [19]
Low et al.

[11] 3,750,016
[45] July 31, 1973

[54] RF-SOURCE RESISTANCE METERS

[76] Inventors: George M. Low, Acting Administrator of the National Aeronautics and Space Administration with respect to the invention of; Ernest C. Oakley, Pasadena, Calif.

[22] Filed: Feb. 19, 1971

[21] Appl. No.: 116,790

[52] U.S. Cl............. 324/57 R, 324/29.5, 324/62 R, 324/95
[51] Int. Cl...................... G01r 27/00, G01r 27/42
[58] Field of Search............... 324/62 R, 57 R, 29.5, 324/106, 95, 104, 103 R, 103 P, 142, 143, 64

[56] References Cited
UNITED STATES PATENTS

| | | | |
|---|---|---|---|
| 2,084,086 | 6/1937 | Heyer | 324/29.5 |
| 1,520,865 | 12/1924 | Heyer | 324/29.5 |
| 2,316,153 | 4/1943 | Brown | 324/57 R |

*Primary Examiner*—Rudolph V. Rolinec
*Assistant Examiner*—Ernest F. Karlsen
*Attorney*—Monte F. Mott, Paul F. McCaul and John R. Manning

[57] ABSTRACT

Several embodiments of RF source resistance measuring devices are disclosed. Common to all embodiments is the feature of the inclusion of at least one variable resistor, and a peak readout meter. In one embodiment, two ganged unloaded potentiometers are employed while another embodiment comprises an automatic-nulling RF power bridge circuit with a variable rather than a fixed bridge reference resistance. A third embodiment comprises a calorimeter with a variable rather than a fixed resistor, while in another embodiment attenuator pads with variable resistors are employed.

3 Claims, 9 Drawing Figures

ERNEST C. OAKLEY
INVENTOR.

BY
ATTORNEYS

ERNEST C. OAKLEY
INVENTOR.

RF-SOURCE RESISTANCE METERS

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

1. Field of the Invention

This invention relates to means for measuring the resistance of a radio frequency (RF) source and, more particularly, to improvements therein.

2. Description of the Prior Art

There are several known methods or devices to determine RF source resistance. However, most of these suffer from one or more significant disadvantages. A technique known as double loading, in which the ratio of the change in output voltage as the load resistance is changed, is cumbersome, time consuming and is subject to reactive errors beginning in the low VHF region. Also, in practicing such a technique normal circuit operation is distrubed. In another method, known as reactive-transformation power peaking, a coaxial line or a lumped constant reactive tuner is required, to maximize the power into a load resistance. The combined network of the reactive-tuner and the resistive power detecting device are then disconnected from the output port being measured and the conjugate complex impedance of this network is inferred as the output port parameters. Although such a measurement produces accurate results, its primary disadvantages are the bulkiness of the coaxial reactive tuners, and the fact that such tuners are not available below the UHF region. There are other RF source resistance measurement techniques which are quite sophisticated and complex. Most of them treat the non-linear active output port as a linear, passive input port, and hence do not yield a valid or meaningful measurement under normal circuit operating conditions.

OBJECTS AND SUMMARY OF THE INVENTION

It is a primary object of the present invention to provide new devices for measuring RF source resistance.

Another object of the present invention is to provide novel RF source resistance measuring devices which do not suffer from the disadvantages characteristic of prior art devices.

A further object of the present invention is to provide RF source resistance measuring devices, which are reliable, very simple to operate and relatively inexpensive as compared with prior art devices.

These and other objects of the present invention are achieved by providing RF source resistance measuring devices, each one of which includes at least one variable resistor whose resistance is adjusted to provide a peak reading on a readout meter, the dial of which is calibrated in terms of RF source resistance. In one embodiment of the invention, an automatic-nulling RF power bridge circuit is employed with a variable rather than a fixed bridge reference resistance, and with a bolometer mount connected as one leg of the bridge. In another embodiment ganged, unloaded potentiometers are used to determine RF source resistance, while in yet another embodiment the device comprises a calorimeter with a variable resistor which is adjusted for maximum power transfer which is recorded by the calorimeter. In yet another embodiment of the device, the impedance-matching property of an attenuator pad with variable resistors is utilized. The resistors are varied for maximum power transfer to the pad which acts as the load when maximum power transfer takes place as indicated by an appropriate peak readout meter, the pad or load resistance matches the RF source resistance.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
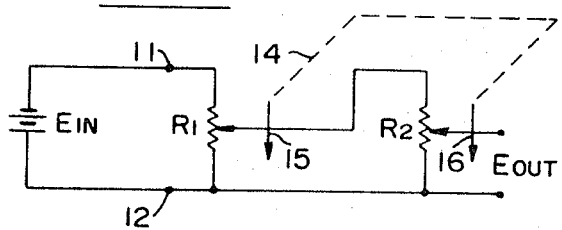
FIGS. 1-4 are schematic diagrams useful in explaining embodiments of the invention employing ganged phased potentiometers.

The embodiment of the invention in which ganged unloaded variable resistors or potentiometers are employed for source resistance measurement may best be explained in conjunction with FIGS. 1-4. In FIG. 1, a potentiometer $R_1$ is shown connected across a voltage source $E_{IN}$ at terminals 11 and 12. A second potentiometer $R_2$ is shown connected across the wiper of $R_1$ and terminal 12. The output voltage $E_{OUT}$ is taken across the wiper of $R_2$ and terminal 12. $R_2$ is assumed to be much greater than $R_1$ ($R_2 >> R_1$) so as not to appreciably load $R_1$.

If the two potentiometers are ganged and their wipers phased and tracked as represented by dashed line 14 and arrows 15 and 16, the output voltage will vary as the square of the coefficient of rotation (wiper movement). The potentiometers thus ganged perfrom the analog computation of solving for the product of the input voltage times the square of the percentage of mechanical wiper shaft rotation.

Figure 2:
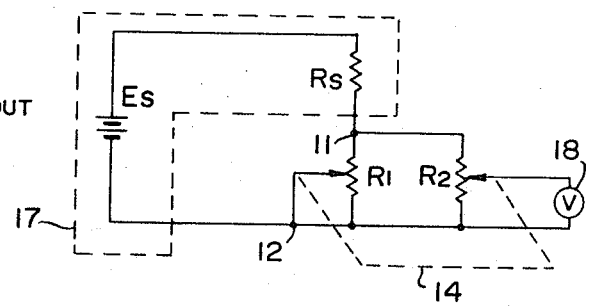

In practice, the potentiometers are connected as shown in FIG. 2. Therein, dashed line 17 encloses a source $E_S$ with an internal resistance $R_S$ which is to be measured. Relating FIG. 2 to FIG. 1, $R_1$ and $R_2$ are connected across the output terminals 11 and 12 of the source $E_S$, while the wiper of $R_1$ is connected to terminal 12. A voltmeter 18 serving as peak readout detector is connected across the wiper of $R_2$ and terminal 12. In FIG. 2, the internal resistance $R_S$ represents the top part of $R_1$ in FIG. 1. As can be seen, $R_2$ still divides the voltage divided by the ratio of the source resistance $R_S$, and the lower arm composed of the unshorted part of $R_1$.

The output voltage as indicated on the voltmeter detector 18 varies linearly as the source resistance $R_S$, assuming the potentiometers $R_1$ and $R_2$ static. If however, the source resistance $R_S$ is held constant and the ganged-potentiometers $R_1$ and $R_2$ are varied, a peak reading will be indicated at a discrete settting of the ganged-phased potentiometer pair which will be different for each incremental change of $R_S$. A calibration can be established to relate the source resistance $R_S$ and the percentage of rotation, from which a direct indication of $R_S$ is determinable.

The value of $R_1$ can be chosen so that a match to the source resistance will coincide with a peak reading on the voltmeter-detector 18. Match will occur at this value of $R_1$ since incremental changes in $R_1$ as it is rotated will vary roughly as the square root of the incremental changes of $R_S$, $\Delta R_1 \approx \sqrt{\Delta R_S}$.

Figure 3:
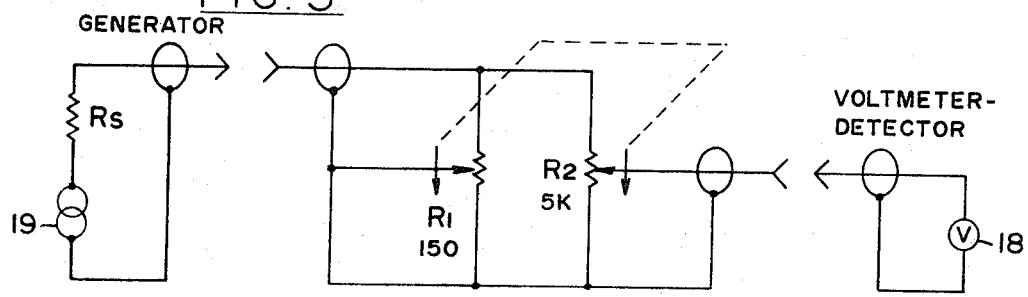

FIG. 3 is a schematic diagram of an example of source resistance measuring arrangement for a coaxial system with a 50 ohm operational resistance. $R_1$ is chosen to be 150 ohm, based on experimental data showing $R_1$ to lie between 100 and 250 ohms. $R_2$ is chosen to be $5k$ ohms to yield one-half percent loading error on the terminated network of $R_S$ and $R_1$ at match (25 ohms equivalent). The source resistance as 'seen' by the voltmeter-detector 18 is a maximum of about $1.3k$ ohms. The voltmeter-detector 18 is chosen to have a frequency response suitable for the frequency of the generator source 19. Also, its input resistance should be sufficiently high so as not to load $R_2$. That is, $R_{IN} >> 1.3k$ ohms. It is further desirable that the scale of voltmeter-detector 18 have sufficient resolution to impart ease in determining the peak reading.

Figure 4:
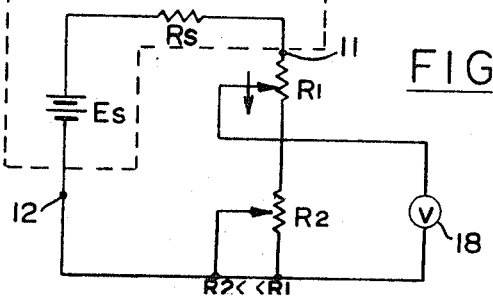

FIG. 4 to which reference is now made represents an alternate embodiment in which current through the variable load resistance, rather than voltage, is sensed to determine source resistance. In this embodiment, two potentiometers $R_1$ and $R_2$ are connected in series between terminals 11 and 12 and their wipers are phased and tracked. The resistance value of $R_2$ is made low with respect to the resistance of $R_1$, in order not to limit the current when $R_1$ is a relatively small value.

Figure 5:
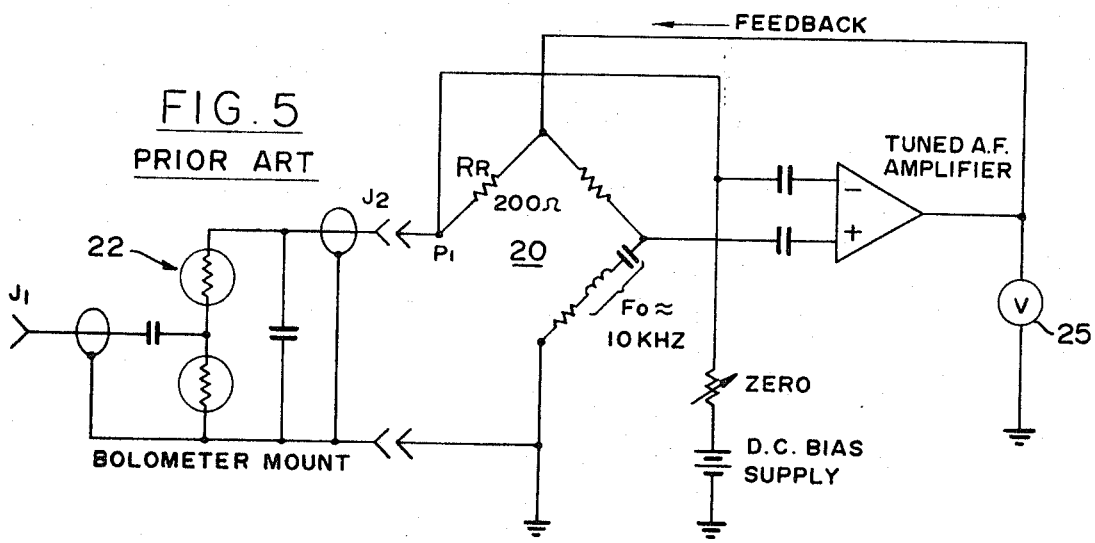
FIG. 5 is a schematic diagram of a prior art automatic-nulling RF power bridge circuit.

Another embodiment of the present invention employs a bolometer mount in which the mount load resistance is varied to provide an indication of source resistance. For an understanding of this aspect of the invention, reference is first made to FIG. 5 which represents a schematic diagram of a known RF power bridge circuit. In the bridge 20, one arm is formed by a bolometer mount 22 which is assumed to be connected at terminal J1 to an RF power source. The operation of such a circuit for power measurements is well known. In actuality, FIG. 5 is the schematic diagram of a power meter model 430c manufactured by Hewlett Packard.

Figure 6:
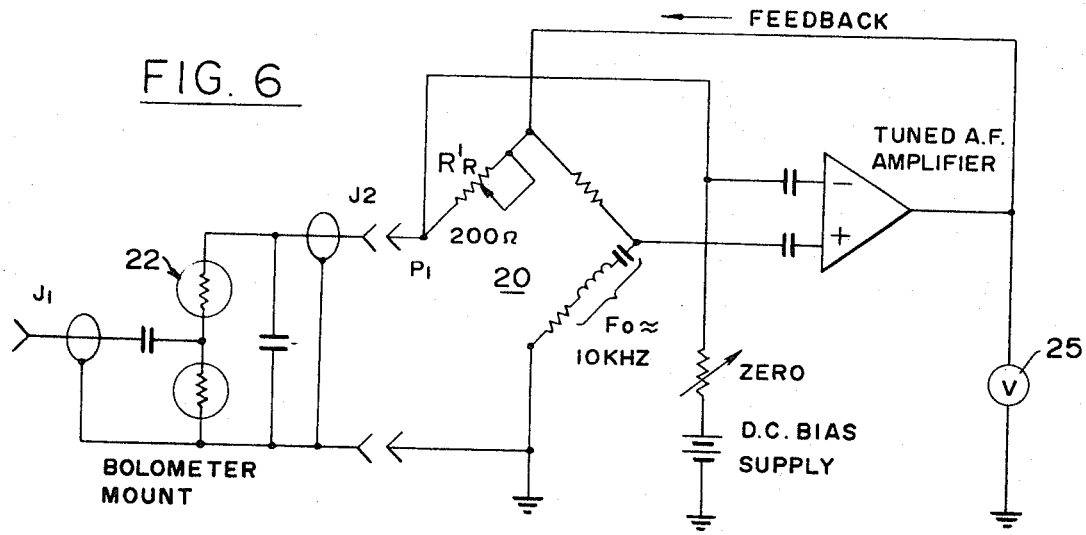
FIG. 6 is a schematic diagram of another embodiment of the invention.

It has been discovered that by replacing the fixed bridge reference resistor $R_R$ with a variable resistor or potentiometer $R_R'$ as shown in FIG. 6, the nominal operating resistance of the power detecting coaxial bolometer mount can be deliberately varied so as to match the mount load resistance, into which maximum power from the RF source connected to J1 will be dissipated. From this the value of the output resistance of the RF source is directly determinable. This is because the maximum power transfer occurs when the load resistance of the bolometer mount and the RF source resistance are equal.

In practice, the RF power is introduced into J1 and $R_R'$ is varied until a peak reading, indicating maximum power transfer, is observed in the readout voltmeter 25. Therefrom one directly infers the matched source resistance, since maximum power will be transferred to the load when it is equal to the source. It should be pointed out that since $R_R'$ is a variable resistor, the DC bias power must be varied so as to maintain the meter 25 at zero when the RF source is disconnected from J1. From the foregoing it is thus seen that by replacing the fixed $R_R$ of the bridge with a variable resistor $R_R'$ a presently available bolometeric automatic-nulling RF power meter is provided with the additional capability of measuring RF source resistance.

Figure 7:
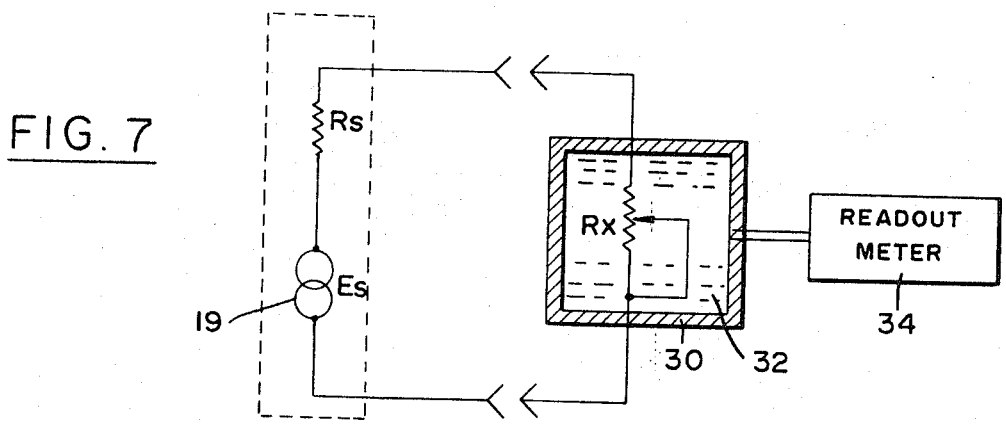
FIGS. 7-9 are diagrams useful in explaining yet other embodiments of the invention.

In yet another embodiment of the present invention, source resistance measurement is performed by means of a calorimeter containing a variable resistor, which is connected across the source, whose resistance is to be measured. Such an arrangement is shown in FIG. 7. Therein, the calorimeter is designated by numeral 30, the variable resistor by $R_x$ and readout meter, which is assumed to indicate the power or heat absorbed by the calorimeter matter such as fluid 32, is designated by numeral 34. It should be apparent that maximum power transfer to fluid 32 occurs when the resistance of $R_x$ equals $R_S$. Thus, the setting of $R_x$ when a peak reading is observed on meter 34 is a direct indication of the source resistance $R_S$.

Such a calorimeter source resistance measuring device has the following advantages:

1. It is inherently broad-band in frequency;
2. It is simple in design and is easily fabricated;
3. It can determine source-resistance over a broad range of input power;
4. It is rugged; and
5. It is extremely simple to operate, requiring only an 'adjust-to-peak' adjustment, with direct readout of source resistance on a properly calibrated dial.

Figure 9:
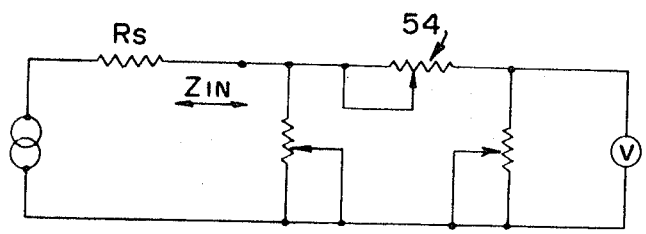
Figure 8:
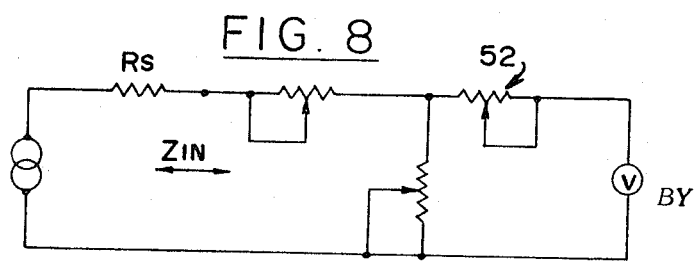

In still another embodiment of the invention, source resistance is determined by means of taper attenuator pads which are either of the Tee or Pi configuration, as shown in FIGS. 8 and 9 wherein they are designated by numerals 52 and 54, respectively. Each of the pads may consist of ganged variable resistors rather than the fixed resistors of typical attenuator pads. Since the power delivered to the load (in the form of the pad) is a maximum when the load resistance equals the source resistance, by monitoring a peak power reading in meter 50, which is assumed to be a power meter, the interpolated value of the input impedance $Z_{IN}$ of the tapered pad which yields maximum power transfer is the value of the source resistance.

There has accordingly been shown and described herein several embodiments of a source resistance measuring device. In each embodiment, the device includes at least one variable resistor which is adjusted to provide a peak power reading, with the resistor's setting for peak power being used to indicate the resistance of the source to which the device is connected. It is appreciated that modifications and variations may readily occur to those skilled in the art and, consequently, it is intended that the claims be interpreted to cover such modifications and equivalents.

What is claimed is:

1. A device for measuring the resistance of a source comprising:

a first variable resistor having first and second ends connected across said source, said first variable resistor having a rotatable wiper arm, connected to the second end of said first resistor;

a second variable resistor having first and second ends connected respectively to the first and second ends of said first variable resistor, said second resistor having a rotatable wiper arm, said wiper arms being ganged and phased for simultaneous rotation whereby at each rotational position the ratio of the resistance between the second end of said first resistor and its wiper arm in the absence of the connection therebetween to the total resistance of said first resistor is equal to the ratio of the resistance between the second end of said second resistor and its wiper arm to the total resistance of said second resistor; and readout means connected across the wiper arm of said second resistor and the second end thereof for providing a peak reading as a function of the rotational positions of the wiper arms and the resistance of said source.

2. A device as recited in claim 1 wherein said readout means is a voltmeter and said second resistor is larger than said first resistor.

3. A device as recited in claim 2 wherein said source is a radio-frequency source and said voltmeter has a frequency response including the frequency of said source.

* * * * *